United States Patent
Rakshys, Jr. et al.

[11] 3,919,126
[45] Nov. 11, 1975

[54] INSOLUBLE POLYALKYL PHOSPHONIUM SALT RESINS HAVING CROSSLINKED BACKBONE

[75] Inventors: Joseph W. Rakshys, Jr., Midland, Mich.; Suzanne V. McKinley, Wellesley, Mass.

[73] Assignee: The Dow Chemical Company, Midland, Mich.

[22] Filed: Aug. 23, 1973

[21] Appl. No.: 390,830

[52] U.S. Cl. ...... 260/2.1 E; 260/88.2 S; 260/88.1 P
[51] Int. Cl.² ............... C08F 230/00; C08F 210/00
[58] Field of Search ......... 260/80.71, 88.25, 88.1 P, 260/2.1 E

[56] References Cited
UNITED STATES PATENTS

| | | | |
|---|---|---|---|
| 3,168,502 | 2/1968 | Sexsmith et al. | 260/80.71 |
| 3,708,462 | 1/1973 | McKinley et al. | 260/80.71 |
| 3,725,365 | 4/1973 | McKinley et al. | 260/80.71 |
| 3,725,509 | 4/1973 | Kraft et al. | 260/80.71 |
| 3,726,839 | 4/1973 | Jin | 260/80.71 |

*Primary Examiner*—Melvin Goldstein
*Assistant Examiner*—Peter Kulkosky
*Attorney, Agent, or Firm*—Stephen Hoynak

[57] ABSTRACT

Novel resins having a carbon-to-carbon backbone, cross-linked with carbon-to-carbon linkages and having a plurality of

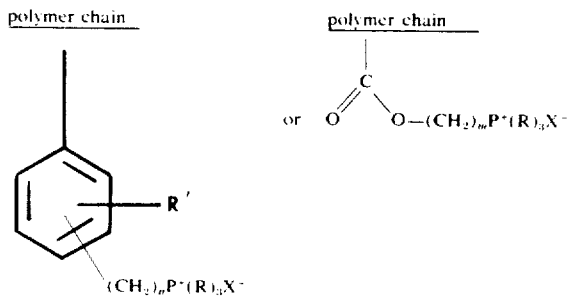

pendant groups, wherein n is an integer of from 1 to 3, preferably 3, m is an integer from 1 to 6, preferably 3, each R is an alkyl group of from 1 to 10 C atoms, preferably 2-6 C atoms, R' is an alkyl or CN, or other group inert to reaction with the phosphonium halides, alkoxides, or the phosphonium salt resins, or in some instances organolithium reagents and X is an alkoxyl or aryloxy group, an OH⁻ group or a hydrocarbyl COO⁻ group or a CN⁻, NO₃⁻, SO₄⁻, or ClO₄⁻ group and a method of their preparation are disclosed. The cross-linked resins are useful as resins and as insoluble catalysts for preparation of glycol ethers from alcohols and epoxides, and for polymerizing epoxides.

12 Claims, No Drawings

INSOLUBLE POLYALKYL PHOSPHONIUM SALT RESINS HAVING CROSSLINKED BACKBONE

BACKGROUND OF THE INVENTION

Tetraalkylphosphonium salt groups attached to a pendant group of a cross-linked polymer are novel. The cross-linked polymers are thermally stable and they are insoluble in known organic solvents, but they are swellable in many solvents and are permeable to many solutions. These properties make them admirably suited for uses such as anion exchange materials or in the cases where the phosphonium salt group is sufficiently basic, (e.g., hydroxide, alkoxides, phenoxides, cycloalkoxides) as insoluble catalysts for the preparation of glycol ethers or for polymerization of epoxides. Use of cross-linked phosphonium salt resins as catalysts for glycol ether synthesis and for polymerization catalysts obviates the necessity of removing catalyst from the glycol ethers and from the epoxide polymers and therefore substantially eliminates the problem of color removal, which is associated with the use of conventional caustic catalysts in glycol ether formation and the polymerization of epoxides.

SUMMARY OF THE INVENTION

It has been found that the insoluble tetraalkylphosphonium salts of this invention are heat stable. The basic reacting salts are excellent catalysts for the prepartion of glycol ethers and for polymerizing epoxides. When used for either purpose color formation in the glycol ether or the epoxide polymer is minimized and catalyst removal is effected by simple filtration or centrifuging. No tedious separation step, such as that necessary when soluble catalysts are employed, is required. Details of the process for the preparation of glycol ethers are given in our copending application entitled "Method of Preparing Monoethers of Alkylene Glycols," Ser. No. 390,453 filed of even date herewith. The teachings of said copending application relative to the preparation of glycol ethers is incorporated herein by reference.

DETAILED DESCRIPTION OF THE INVENTION

The cross-linked polymers have a carbon-to-carbon main polymer chain or backbone and cross-links formed by the addition copolymerization of a mono-olefinically unsaturated monomer and a polyolefinically unsaturated monomer. The pendant groups on the main polymer chain or backbone can contain a tetraalkylphosphonium salt group. The latter on the main polymer chain conforms graphically to the structures bly such hydrocarbyl group having 1 to 6 C atoms, and most preferably an alkyl group of 1 to 6 C atoms, a cycloalkyl or a phenyl group, a $CN^-$, $NO_3^-$, $SO_4^=$ or a $ClO_4^-$ group, R' is H, CN or one or more alkyl groups of 1 to 4 C atoms and preferably the total number of C atoms in all alkyl groups represented by R' is not greater than 4 C atoms, $n$ is an integer from 1 to 3, $m$ is an integer from 1 to 6, preferably 3 to 4, and Z is H or a $CO_2R'''$ group having R''' as defined above or as $-(CH_2)_mP^+(R)_3X^-$ and $y$ is an integer greater than 1. The moiety represented by $y$ constitutes 20–99 mole percent of the entire polymer.

The main polymer chain comprises a carbon-to-carbon backbone which may have alkyl or other substitution thereon in which the substituent is not reactive with organolithium compounds, alkali metal alkoxides or hydroxide groups.

The polymers are cross-linked through carbon-to-carbon bonds by the use of a polyunsaturated monomer during polymerization. Representative cross-linking agents include the divinyl benzenes, lower alkyl substituted divinyl benzenes, trivinyl benzenes, diisopropenyl benzenes, triisopropenyl benzenes, and lower alkyl substituted derivatives thereof in which the substituent has up to 4 carbon atoms; divinyl cyclohexane, trivinyl cyclohexane or any other polyolefinically unsaturated monomer which copolymerizes with the styrene or acrylic ester or maleic monomer or both.

The proportion of cross-linking agent to the monoolefinic monomer can range from about 0.1 to about 30 mole percent. The preferred range is from about 1 to about 6% by weight and most preferred is a range of about 1 to 3% by weight. The preferred cross-linking agents are the divinyl benzenes. Included among the vinyl aromatic compounds to which a $(CH_2)_nP^+(R)_3X^-)$ group can be appended are the haloalkyl aromatic compounds, preferably iodo, bromo or chloro alkyl aromatics. These can be present on a styrene, methyl styrene, ring alkylated styrenes, including vinyl toluene, t-butyl styrene, vinyl xylenes, isopropenyl toluene, isopropenyl xylenes, ethyl styrenes and ethyl isopropenyl benzenes. The vinyl benzene moiety can range from 0–80 mole percent, preferably 50–75 mole percent.

The tetraalkyl phosphonium group can also be attached to an acrylate ester, a methacrylate ester or a maleic ester moiety. The acrylate, methacrylate or maleic ester can be a cross-linked copolymer with a polyolefinic monomer as defined or it can be part of a tri or tetrapolymer with one or two other mono-olefinic monomers which copolymerize with the acrylate ester or maleic ester.

Representative mono-olefins which can be employed

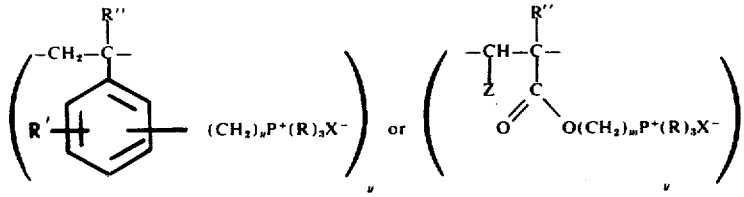

where R'' is H or a methyl group, R is a saturated unsubstituted aliphatic hydrocarbon group of 1 to 10 C atoms, preferably 2 to 6 C atoms, X is an OH or an OR''' group where R''' is a hydrocarbyl group of 1 to 10 C atoms free of aliphatic unsaturation, and preferafor the above purpose include, styrene, methyl styrene, isopropenyl benzenes and lower alkyl substituted vinyl benzenes particularly those having 1 to 4 C atoms in the alkyl group.

There are two general routes for preparing the compositions of this invention.

In one procedure a haloalkyl substituted vinyl benzene can be polymerized with desired amount of a cross-linking agent and optionally with one or more mono-olefinically unsaturated monomers which copolymerize with the other monomers in the system.

The resulting cross-linked polymer having haloalkyl groups on the side chains is reacted with a trialkyl phosphine to form a polymer having tetraalkyl phosphonium halide pendant groups on the side chain. The phosphonium structure can be on 20–99 mole percent of the pendant groups, preferably on 24–99% of such groups.

The tetraalkyl phosphonium halide containing resins are then converted to alkoxides directly be reaction of the halide anion with a metal alkoxide, particularly an alkali metal alkoxide, or indirectly by first converting the halide to a salt of an organic carboxylic acid and then reacting the latter with an alkali metal alkoxide. Thus, the direct conversion of the tetraalkyl phosphonium halide group to the alkoxide is possible if the anion is Cl$^-$ or Br$^-$, and the indirect route via carboxylic acid salt formation is preferred if the anion is I$^-$.

Preparation of Tetraalkyl Phosphonium Halides

The general route for preparing tetraalkyl phosphonium halide resins is to react a swollen cross-linked haloalkyl substituted polymer with a trialkyl phosphine in a solvent which is inert to the trialkyl phosphine, the haloalkyl polymer and the resulting phosphonium halide containing polymer.

Polymers having haloalkyl substituents on a pendant benzene nucleus can be converted to the corresponding phosphonium halide-containing derivatives in accordance with the following formula.

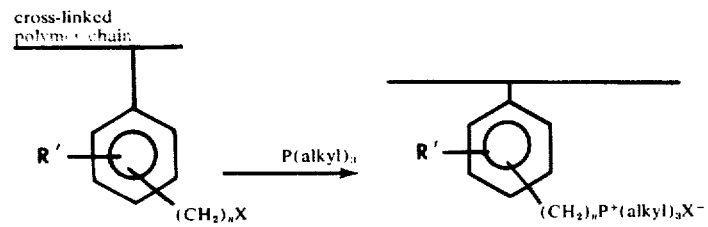

In the formula R', n and X have the designation given above.

In a similar manner, acrylate or maleic esters having a haloalkyl group in the ester moiety can be reacted with a trialkyl phosphine to convert the haloalkyl group to a phosphonium halide group.

Representative inert solvents include benzene, dimethylsulfoxide, and acetonitrile.

Insoluble polymer beads were made by suspension copolymerization of a mixture of 2:1 molar styrene-p-bromo-styrene and 2 weight percent based on the total weight of styrenes of divinyl benzene.

11.6 Parts by weight were swollen in benzene and 50 ml. of 2.9 M, n-butyllithium in benzene (9.3 parts by weight on n-butyllithium) were added, under a nitrogen atmosphere. The mixture was stirred for three days. Excess butyllithium was removed and the beads were washed with benzene, while in an inert atmosphere. A benzene solution containing 1.7 weight parts of trimethylene oxide was added and the mixture was stirred for several hours at 0°C. followed by refluxing for 4 hours. By this reaction —CH$_2$CH$_2$CH$_2$OH replaced the Br on the aromatic pendant rings of the polymer. After washing with water, a tetrahydrofuran-water mixture, tetrahydrofuran and then ether, the polymeric beads were dried. Analysis showed complete removal of Br from the polymer.

Ten weight parts of the Br-free polymer, were treated with 7–9 weight parts of I$_2$ and 10 weight parts of triphenyl phosphite to convert the —CH$_2$CH$_2$CH$_2$OH group to —CH$_2$CH$_2$CH$_2$I.

After stirring with reflux overnight, the polymer beads were cooled, filtered and washed with benzene and methanol.

Four weight parts of the beads containing the iodopropyl group were swollen in benzene and treated with a two-fold excess of triethyl phosphine and stirred at reflux for 8 hours. Dimethyl sulfoxide in a quantity of about one-third the volume of the mixture in the flask, was added and the mixture was refluxed overnight. The polymer having

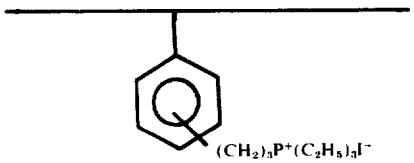

groups attached to the main polymer chain was filtered, washed with benzene and methylene chloride and then dried. Analysis indicated 1.58 mmole functional groups per gram of resin.

To make polymers with —CH$_2$P$^+$(R)$_3$X$^-$ groups a cross-linked copolymer of monochloromethyl vinyl benzene is reacted with trialkyl phosphine. Correspondingly, other vinyl benzenes with —halo—CH$_2$ or other haloalkyl groups on the ring can be used.

Methacryloyl chloride was reacted with 3-bromo-1-propanol in benzene in the presence of pyridine. The 3-bromopropyl methacrylate was recovered by fractional distillation at 63°–70°C. and 1.5 mm. pressure.

A mixture of 1.1 molar ratio of styrene and the above methacrylate and 1.7 weight percent of divinyl benzene was polymerized by a suspension procedure using benzoyl peroxide as a catalyst.

A resin having phosphonium bromide pendant groups was prepared by swelling 1.18 parts of the cross-linked 3-bromopropyl methacrylate-styrene-divinyl benzene beads in benzene, and treating the mixture with 2 equivalents of triethyl phosphine. Ten ml. of dimethylsulfoxide were added to the mixture which was then refluxed overnight. The so-treated beads were filtered, washed with benzene, dimethyl sulfoxide and benzene and then dried. Analysis showed that the polymer contained 4.97% P and 12.3% Br.

Another phosphonium bromide resin was prepared in the same manner, from the bromopropyl methacrylate containing resin, except for the use of tributyl phosphine for conversion of the bromopropyl methacrylate. This polymer contained 4.31% P and 11.63% Br.

Maleic acid esters having one to two —$(CH_2)_m$— halide groups can also be copolymerized with a mono-olefinic polymerizable monomer and a cross-linking agent. Both carboxyl groups, should be esterified, but only one need have a —$(CH_2)_m$— halide ester linkage.

Preparation of Polymeric Phosphonium Compounds of This Invention

The examples are intended to illustrate, but not to limit the invention. Parts and percentages are given by weight unless otherwise specifically indicated.

EXAMPLE 1

This example discloses an indirect method of converting a pendant tetraalkyl phosphonium halide to the corresponding alkoxide.

One weight part of the resin having a plurality

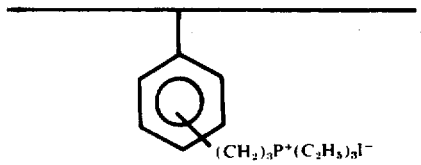

pendant groups, prepared as described above, was swollen in an 80/20 (V/V) dimethylsulfoxide-water mixture and treated in a column with 6.6 weight parts of sodium acetate (50 equivalents) dissolved in 100 ml. of an 80/20 (V/V) dimethylsulfoxide-water mixture. Removal of iodide from the resin was quantitative. The resin beads were then removed from the column, placed in 80/20 (V/V) ethanol-water in which 3.7 weight parts of Na (100 equivalents) were dissolved. The beads were then washed until the effluent was neutral. Titration of the beads for base content indicated that at least 60% of the original I was converted to basic groups as $OC_2H_5^-$ or $OH^-$.

Lithium chloride can be used in place of sodium acetate, in which event a halogen exchange is effected to convert the $I^-$ to $Cl^-$. The $Cl^-$ can then be converted directly to an alkoxide and/or hydroxide by reaction with an alkali metal alkoxide or hydroxide. If the halogen in phosphonium group on the resin is a bromine atom, it also can be displaced directly with an alkali metal alkoxide or hydroxide.

The tetraalkyl phosphonium halide groups of the general structure

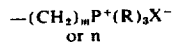

can be converted to

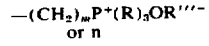

by following the above steps with alkali metal salts of other carboxylic acids. Other alkoxides of alkanols having 1 to 10 C atoms are prepared by substituting the alkali metal alkoxide of the other alkanol for $NaOC_2H_5$.

$CN^-$, $NO_3^-$, $SO_4^=$, or $ClO_4^-$ groups replace the halogen by reacting an alkali metal salt containing one of said groups with the tetraalkyl phosphonium halide.

Resins having

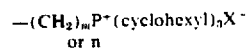

groups appended to the benzene nucleus are prepared by reacting tricyclohexylphosphine with the

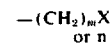

form of resin and then proceeding as described above.

EXAMPLE 2

The alkoxide or hydroxide form of the triethylpropyl and tributylpropyl phosphonium methacrylate resin were made by the indirect procedure via the acetate route described above.

Thus, 1 part by weight of the resin in which the methacrylate ester moiety contained a —$(CH_2)_3P^+(C_2H_5)_3$ $Br^-$ group was treated with 6.6 weight parts of sodium acetate dissolved in an 80/20 (V/V) dimethylsulfoxide-water mixture. The reaction product (the acetate) was then reacted with sodium ethoxide or hydroxide to exchange $OC_2H_5^-$ or $OH^-$ for the acetate group.

In the like manner, the resin having —$(CH_2)_3$ $P^+(C_4H_9)_3$ $Br^-$ in the ester moiety was first converted to the acetate by exchange for the $Br^-$ and then —$OC_2H_5^-$ or $OH^-$ was exchanged for the acetate.

The conversion of the tetraalkyl phosphonium bromide to its alkoxide or hydroxide by exchange of the $Br^-$ can be effected directly with an alkali metal alkoxide or hydroxide.

Also, $Br^-$ can be exchanged for $CN^-$, $No_3^-$, $SO_4^=$ to or $ClO_4^-$ by means described for the styrene containing resins.

All the reactions of the acrylate resins can also be used for converting maleic ester containing resins to resins containing tetraalkyl phosphonium groups of the type herein indicated.

We claim:

1. An insoluble polymer having a carbon to carbon cross-linked backbone, said polymer having a plurality of

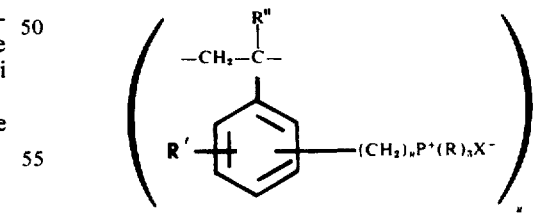

groups where R'' is H or a methyl group, R is a saturated unsubstituted aliphatic hydrocarbon group having from 1 to 10 C atoms, X is an $OH^-$ or an $OR'''$ group where R''' is a hydrocarbyl group of 1 to 10 C atoms free of aliphatic unsaturation, a $CN^-$, $NO_3^-$, $SO_4^=$, or a $ClO_4^-$ group, R' is H, CN or one or more alkyl groups of 1 to 4 C atoms wherein the number of C atoms is not greater than 4, $n$ is an integer of from 1 to 3, and $y$ is an integer greater than 1 and constitutes from 20 to 99 mole percent of the polymer, from about 0.1 to about 30 mole percent being derived from a polyolefinic monomer and the remainder being derived from a monoolefinic monomer.

2. A polymer of claim 1 in which R' is H and X⁻ is an alkoxy group of 1 to 6 C atoms.

3. A polymer of claim 1 in which R' is H and X is OH⁻.

4. A polymer of claim 1 in which R' is H and $n$ is 3.

5. A polymer of claim 1 in which R' is —CH₃ and $n$ is 3.

6. A polymer of claim 2 in which the said alkoxy group has 2 to 4 C atoms.

7. A polymer of claim 1 in which X is a phenoxy group.

8. A polymer of claim 1 in which X is a cycloalkoxy group.

9. A method of preparing a polymer having a carbon to carbon backbone cross-linked backbone, said polymer having a plurality of

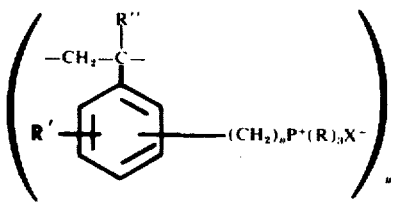

groups wherein R" is H or a methyl group, R is a saturated unsubstituted aliphatic hydrocarbon group having from 1 to 10 C atoms, X is an OH⁻ or an OR''' group where R''' is a hydrocarbyl group of from 1 to 10 C atoms free of aliphatic unsaturation, a CN⁻, NO₃⁻, SO₄⁼ or ClO₄⁻ group, R' is H, CN or one or more alkyl groups of 1 to 4 C atoms wherein the number of C atoms is not greater than 4, $n$ is an integer of from 1 to 3, and $y$ is an integer greater than 1, and constitutes from 20 to 99 mole percent of the polymer, from about 0.1 to about 30 mole percent being derived from a polyolefinic monomer and the remainder being derived from a monoolefinic monomer comprising, reacting the corresponding tetraalkyl phosphonium halide in which the halide is Cl or Br with an alkali metal alkoxide or an alkali metal compound having a CN⁻, NO₃⁻, SO₄⁼ or ClO₄⁻ group.

10. The method of preparing a polymer as defined in claim 9 wherein the tetraalkyl phosphonium halide is an iodide, comprising reacting said tetraalkyl phosphonium iodide with a salt of an organic carboxylic acid and thereafter adding an alkali metal alkoxide to the reaction product.

11. A polymer of claim 1 which has a plurality of

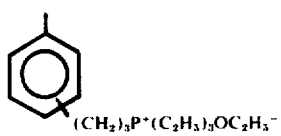

pendant groups attached to main polymer chain.

12. The method of claim 10 in which the tetraalkyl phosphonium iodide of the structure

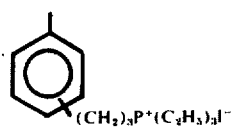

is reacted with sodium acetate and then the reaction product thereof is reacted with sodium hydroxide in ethanol.

UNITED STATES PATENT AND TRADEMARK OFFICE
CERTIFICATE OF CORRECTION

PATENT NO. : 3,919,126

DATED : November 11, 1975

INVENTOR(S) : Joseph W. Rakshys, Jr.
Suzanne V. McKinley

It is certified that error appears in the above-identified patent and that said Letters Patent are hereby corrected as shown below:

In the Abstract, line 13 (second column), delete "$SO_4^-$" and insert --$SO_4^=$--

Col. 1, in the second structure, move the "y" from inside the large parenthesis to the lower right hand side of the large parenthesis.

Col. 3, line 16, delete the word "be" and insert -- by --

Col. 5, line 44, delete the symbol "I" and insert -- $I^-$ --

Col. 6, line 37, delete "to"

Signed and Sealed this second Day of March 1976

[SEAL]

Attest:

RUTH C. MASON
*Attesting Officer*

C. MARSHALL DANN
*Commissioner of Patents and Trademarks*